US006182679B1

(12) United States Patent
Pendleton

(10) Patent No.: US 6,182,679 B1
(45) Date of Patent: Feb. 6, 2001

(54) SUMP STABILIZER BAR

(75) Inventor: David R. Pendleton, Fairfield, OH (US)

(73) Assignee: Delaware Capital Formation, Inc., Wilmington, DE (US)

(*) Notice: Under 35 U.S.C. 154(b), the term of this patent shall be extended for 0 days.

(21) Appl. No.: 09/413,562

(22) Filed: Oct. 6, 1999

Related U.S. Application Data

(63) Continuation-in-part of application No. 09/167,377, filed on Oct. 6, 1998, now abandoned.

(51) Int. Cl.[7] ................................ E02D 29/00; F16L 5/00

(52) U.S. Cl. ......................... 137/68.14; 137/312; 141/86; 405/52

(58) Field of Search ................................ 137/68.14, 312; 141/86; 405/52

(56) References Cited

U.S. PATENT DOCUMENTS 4,842,163 * 6/1989 Bravo ............................... 137/312 X
4,989,634 * 2/1991 Rieseck ............................ 137/312 X
5,098,221 * 3/1992 Osborne ................................ 405/52
5,099,894 * 3/1992 Mozeley, Jr. ........................... 141/86
5,135,324 * 8/1992 Bravo .................................... 405/52
5,167,470 * 12/1992 Bertolozzi et al. .................... 405/52
5,246,044 * 9/1993 Robertson et al. .................... 141/86
5,398,976 * 3/1995 Webb .................................... 285/93
5,427,474 * 6/1995 Silvers .................................. 405/52
5,527,130 * 6/1996 Webb .................................... 405/52
5,564,858 10/1996 Bravo .
5,813,797 * 9/1998 Pendleton et al. ..................... 405/52

FOREIGN PATENT DOCUMENTS

WO9317266 9/1993 (WO) .
WO9416987 8/1994 (WO) .
WO9815476 4/1998 (WO) .

OTHER PUBLICATIONS

Environ, *GeoFlex ™ Piping System*, Pub. PM–0402, Issue Date Feb. 01, 1994, various pages, Environ Products, Inc., Lionville, PA.

Environ, *Dispenser Containment Manual*, Pub. P–DCM–4030, Issue Date May 15, 1995, various pages Environ Products Inc., Lionville, PA.

Environ, *The GeoFlex™ System*, Pub. P–APB–2010, Issue Date Oct. 1, 1996, various pages, Environ Products, Inc., Lionville, PA.

Environ, *Product Price List*, Pub. P–APB–1010, Aug. 15, 1996, various pages, Environ Products, Inc., Lionville, PA.

Advanced Polymer Technology, Inc., *Poly–Tech™ "Large Mouth"Modular Dispenser Sump*, Pub. LM201, Apr. 1, 1996, various pages, Elkhart, Indiana.

Total Containment Inc. *US Price Manual*, Pub. PM1500, Apr. 1, 1995, various pages, Oaks, PA.

Total Containment Inc., *Pioneering Secondary Containment Systems for Future Generations*, PB100, Apr. 1995, various pages, Oaks, PA.

Total Containment Inc., *Dispenser Sumps*, Publications No. DS800, Sep. 1, 1994, various pages, Oaks, PA.

OPW, *Pomeco Products*, CPOM Version 2, Printed Apr. 1997, p. 18, OPW Fueling Components Cincinnati, Ohio.

Pisces, *Dispenser Containment Sumps and Pans*, date Unknown.

* cited by examiner

*Primary Examiner*—John Rivell
(74) *Attorney, Agent, or Firm*—Dinsmore & Shohl LLP

(57) ABSTRACT

An adjustable, compact and stable sump stabilizer bar is disclosed. In one embodiment, the stabilizer bar may be made from a continuous material and the bar may be unitary in form. The stabilizer bar may include a substantially planar and continuous plate, and is configured to adjustably mount components, such as shear valves, to the stabilizer bar. Tabs extend substantially perpendicular to, and in generally opposite directions from, the plate. The tabs are configured to adjustably secure the stabilizer bar to the mounting struts in a sump. A shear valve may be adjustably and stably mounted to a sump using the stabilizer bar in close-to-side-wall pipe entry applications without interference from stabilizer bar components or parts.

28 Claims, 8 Drawing Sheets

SUMP STABILIZER BAR

RELATED APPLICATION

This application is a continuation-in-part of application Ser. No. 09/167,377 filed on Oct. 6, 1998, now abandoned, the entire disclosure of which is hereby incorporated herein by reference.

TECHNICAL FIELD

The present invention relates generally to structural members for sumps.

BACKGROUND

In a typical fueling station, fuel is delivered through a network of underground tanks, pipes, fittings, sumps and dispensers. Shear valves are often utilized in this network to automatically close the flow of fluids and gases in a supply pipe when that pipe is exposed to unusual forces. In addition, shear valves operate to maintain the overall integrity of their associated network by breaking or shearing off at a predetermined weak point downline of their closed position. Thus, shear valve installations reduce the magnitude of spills and leaks that would otherwise be associated with such unusual forces.

For example, if a vehicle were to run over a dispenser equipped with shear valves, one or more of the shear valves associated with that dispenser would operate to close the flow of fuel or vapors from their respective supply pipes to that dispenser. Moreover, the affected shear valves would also allow the dispenser to be "broken off" from the remainder of the fueling network, thereby preserving the network's overall integrity. However, to ensure that the shear valves will break or shear at their designed location in such loading conditions, they must be adequately and stably anchored.

Another potential problem associated with fueling stations is that fluids, such as gasoline, can leak or spill from the network, enter the soil surrounding the network, and pass into the ground water. To contain such leaks and spills originating from dispensers and their fittings, dispenser sumps are often installed below the dispensers. In addition to containing leaks and spills, these sumps also provide access to the underground pipes, fittings, machinery and the like.

Therefore, to preserve the integrity of a fueling network, and to reduce the impact of contaminations related to fuel leaks and spills, it is advantageous to use both shear valves and dispenser sumps in fueling networks. In this regard, it would be advantageous for manufacturers of dispenser sumps to provide sumps that can be used with various dispenser and shear valve configurations, including both new and retrofit construction applications. Increased compatibility would allow manufacturers to reduce the number of sump models produced, thereby providing cost savings to both the manufacturer and the end user.

To best effectuate the collection of any fuel leaks or spills associated with their operation, and to optimize their accessability, shear valves are mounted in the mouth of a sump. Sumps often include a structural frame surrounding the sump mouth that, in addition to providing structural integrity to the sump shell, also provides an anchor in the concrete to which shear valves may be attached. Typical shear valves, however, cannot be mounted directly to the sump frame as they require an assured cleared distance from the sump wall and other obstructions for proper and safe operation, and must be properly oriented with pipe entries of the respective dispenser. Therefore, sump stabilizer bars, also known as shear valve stabilizer bars, must be used to anchor typical shear valves to such frames.

To ensure a shear valve remains stable and properly anchored when placed under a load, the valve's respective stabilizer bar must be designed to withstand the resultant rotational forces that will be applied at the points of connection between the shear valve and the stabilizer bar. Likewise, the stabilizer bar must also withstand the resultant rotational forces applied to its connections with the sump frame. Moreover, in addition to being stable, a stabilizer bar should be compatible with dispensers that have pipe entries located off the center line.

Although adjustable stabilizer bars are known in the field, they are commonly bulky and expensive to manufacture as they often require welding, bolting, and/or a variety of components. In addition to being ill-suited for multiple shear valve applications because of their bulk, existing designs are also limited in how close to the sump walls the shear valves or other components can be mounted. In applications where the dispenser model has pipe entries located very close to the side or end walls of the dispenser and sump, this limitation of existing stabilizer bars can only be overcome through the installation of special fittings, such as product offsets, or through the use of a different sump model.

Conventional stabilizer bars are also limited in that they are often rigid and need shims to make up clearance space between the bar and the respective walls of the sump. In addition, conventional stabilizer bar designs often require that various sizes of the bar be manufactured for various sizes and types of sumps. Therefore, there is a need for a stable and adjustable shear valve stabilizer bar that overcomes the aforementioned problems.

SUMMARY OF THE INVENTION

Accordingly, an object of this invention is to provide an improved sump stabilizer bar.

Another object of the invention is to provide a stabilizer bar that expands the number of dispenser orientations with which a particular sump can be used.

Still a further object of the invention is to provide such a stabilizer bar that retains proper anchoring ability.

Yet another object of the invention is to provide such a stabilizer bar with reduced manufacturing costs.

Still another object of the invention is to provide for a adjustable and compact stabilizer bar.

Additional objects, advantages and novel features of the invention will be set forth in part in the description that follows and in part will become apparent to those skilled in the art upon examining or practicing the invention. The objects and advantages of the invention may be realized and obtained by means of the instrumentalities and combinations particularly pointed out in the appended claims.

To achieve the foregoing and other objects, and in accordance with the purpose of the present invention as described above, an apparatus for mounting a component relative to first and second structures is provided. In one embodiment, the apparatus includes a mount, a first connector, and a second connector. The mount has first and second ends. The first connector cooperates with the mount adjacent to the first end of the mount and is associated with a first connection axis. The second connector cooperates with the mount adjacent to the second end of the mount and is associated with a second connection axis. The first and second connection axes are generally non-collinear. The component can be connected to the mount in proximity to one of the first and second walls, while being substantially free of interference from the apparatus.

According to another embodiment of the present invention, a sump stabilizer bar is provided which includes a mounting plate and connected tabs. In one embodiment, the stabilizer bar can be made from a continuous material, such as a bar formed from a sheet of metal or flat stock. According to another embodiment, the bar can be made from separate components that do not share a homogeneous continuum of the same material. The plate is disposed with a mounting mechanism for adjustably attaching a shear valve assembly to the plate. According to one embodiment of this invention, the mounting plate is substantially planar and continuous. Tabs are connected to the plate and extend in generally opposite directions from one another, and longitudinally from, and preferably perpendicular to, the plate. Each of the tabs are disposed with a securing mechanism for adjustably attaching the stabilizer bar to a sump frame.

One example of both a mounting and a securing mechanism is a plurality of slots configured to cooperate with at least one fastener. A combination of bolts and lockwashers can be used in conjunction with the slots on the plate for mounting the shear valve to the stabilizer bar. Likewise, bolts and lockwashers, in combination with spring nuts, can be used in conjunction with holes, slots, or other openings or structures on the tabs to secure the stabilizer bar to the sump frame.

Accordingly, the plurality of slots provided for in this invention allow for shear valve adjustments along three planes. In addition, the location and construction of the tabs allow for shear valves to be installed closer to the side walls of sumps, as the placement of the shear valve and the plurality of slots on the mounting plate are no longer restricted by parts of the stabilizer bar. Moreover, extending the tabs in opposite directions further separates potential pivot points between the stabilizer bar and the sump frame, thereby ensuring that the stabilizer bar adequately resists rotational forces created under loading conditions. Furthermore, the unitary design of one embodiment of this invention allows for a cost effective means of manufacture, while keeping the stabilizer bar compact and strong.

Still other aspects of the present invention will become apparent to those skilled in the art from the following description of a preferred embodiment, which is simply by way of illustration one of the best modes contemplated for carrying out the invention. As will be realized, the invention is capable of other different obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and together with their description serve to explain the principles of the invention. In the drawings.

DETAILED DESCRIPTION

Figure 1:
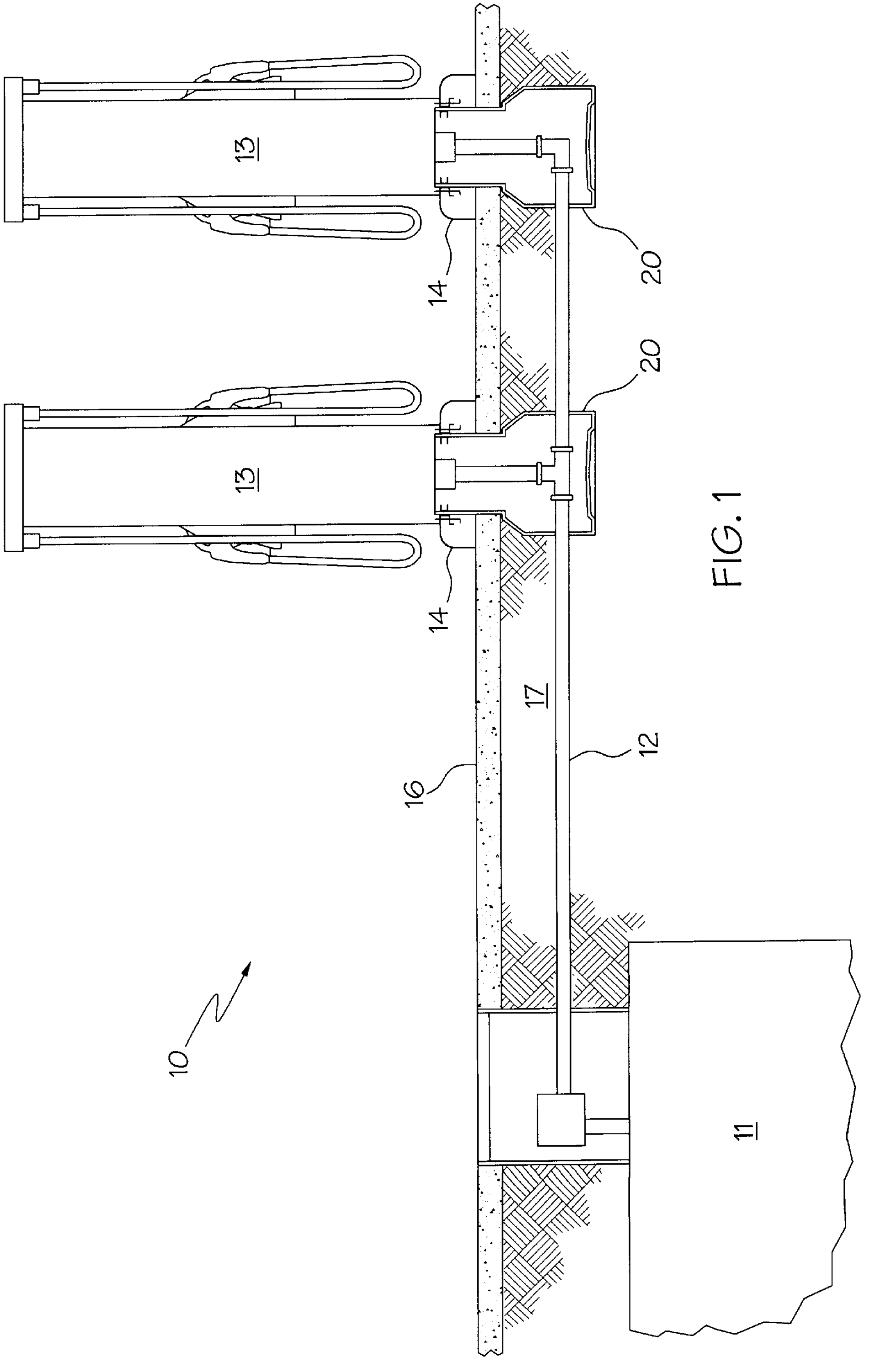
FIG. 1 shows a cross-sectional view of a gasoline fueling station.

FIG. 1 depicts a typical gasoline fueling station 10. Fuel from an underground tank 11 is delivered to the fuel dispensers 13 via the fuel pipe 12. The sumps 20 provide a chamber to access the fittings and pipes beneath the surface of the pavement 16. The sump 20 rises up through the island 14 and opens to the inside of the fuel dispenser 13. The sump 20 can be accessed, through doors (not shown) in the fuel dispenser 13 or by removing the fuel dispenser 13 from the island 14. Beyond providing access to underground components, the sump 20 is designed to contain fuel leakage and/or spillage, and prevent any fuel from seeping into the backfill 17. Additionally, the sump 20 prevents groundwater from filling the chamber.

Figure 2:
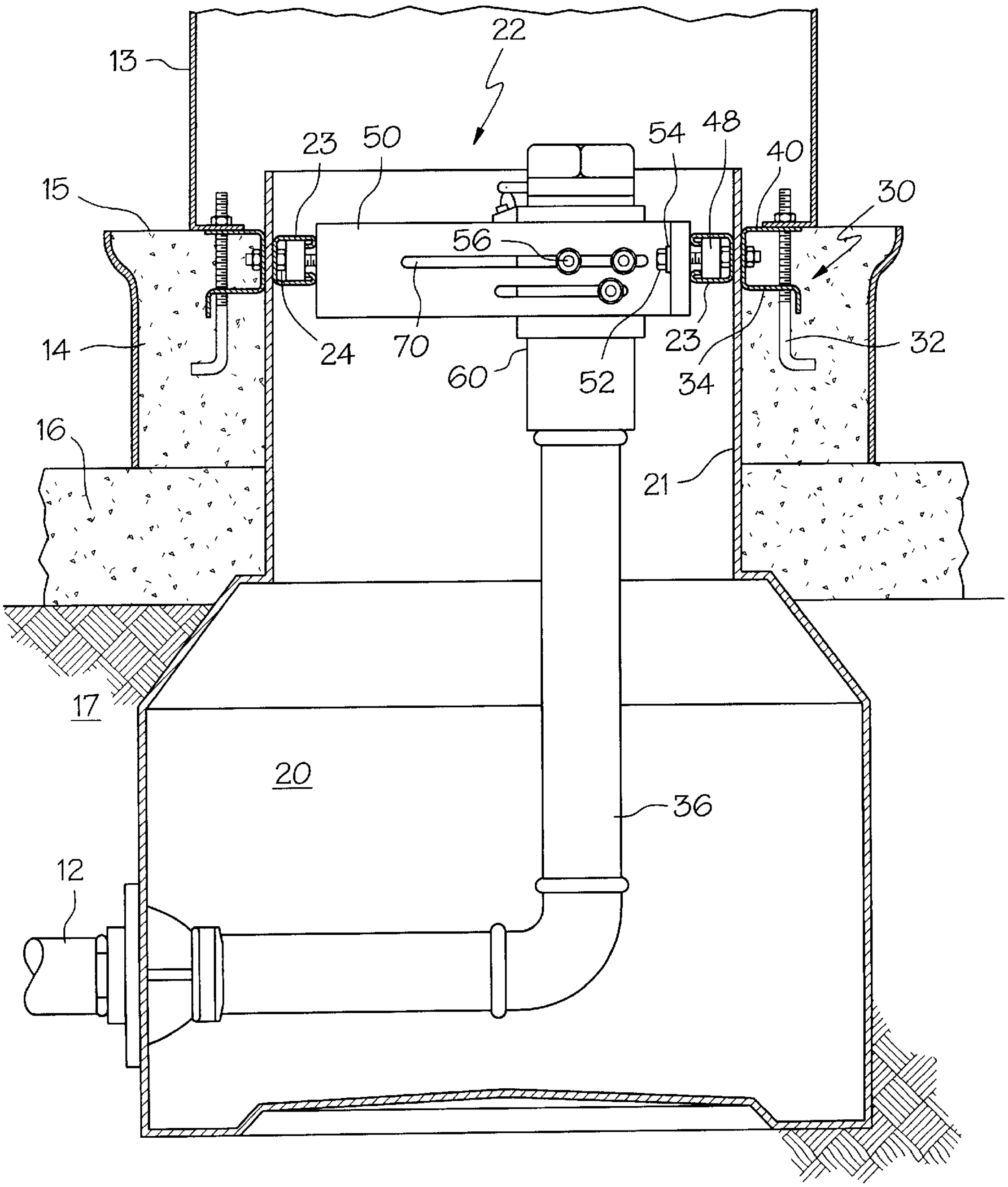
FIG. 2 shows a cross-sectional view of an exemplary use of a dispenser and sump in connection with a gasoline fueling station.
Figure 3:
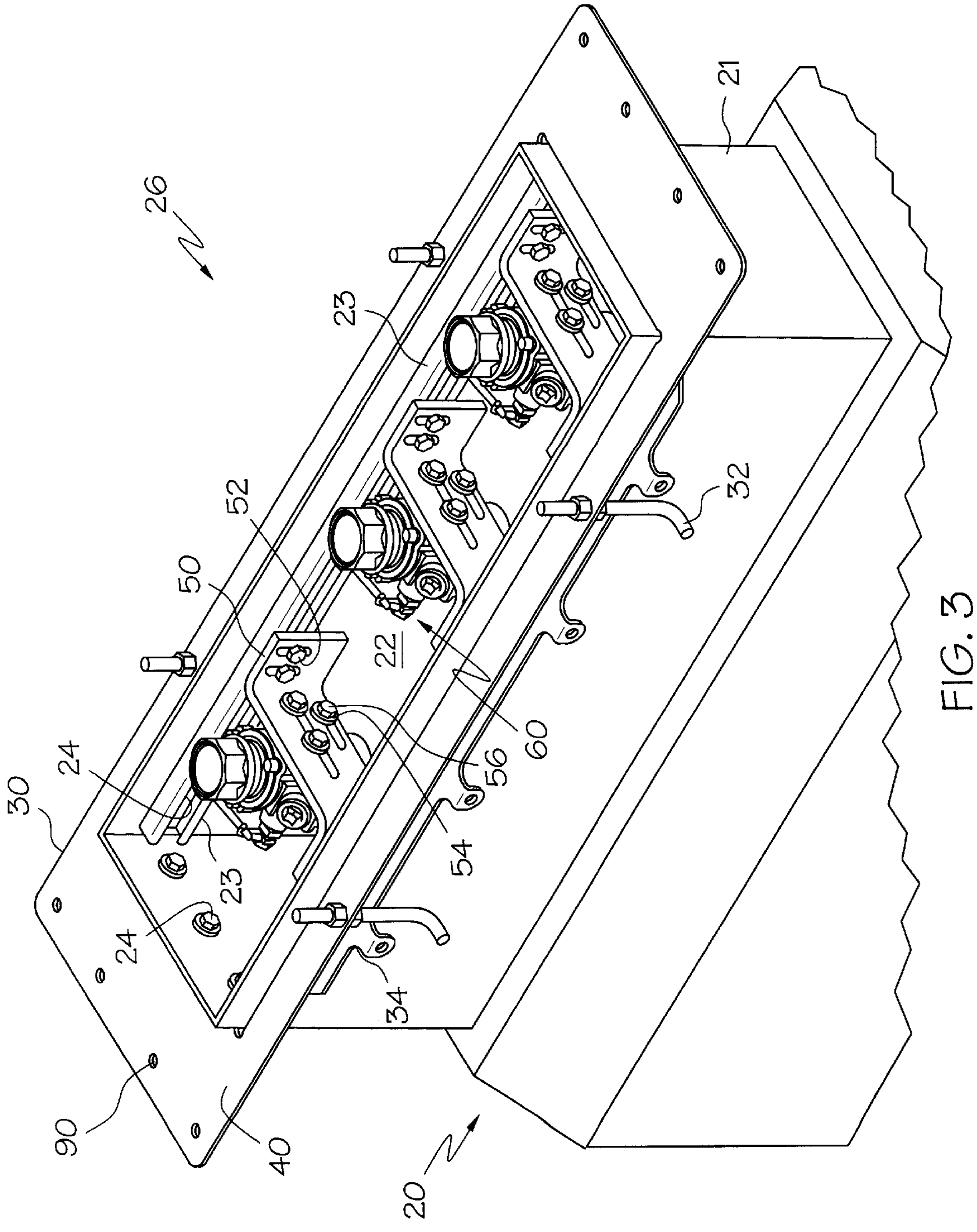
FIG. 3 shows a perspective view of a sump assembly, including a frame, sump wall, sump strut, stabilizer bar, and shear valve.
Figure 4:
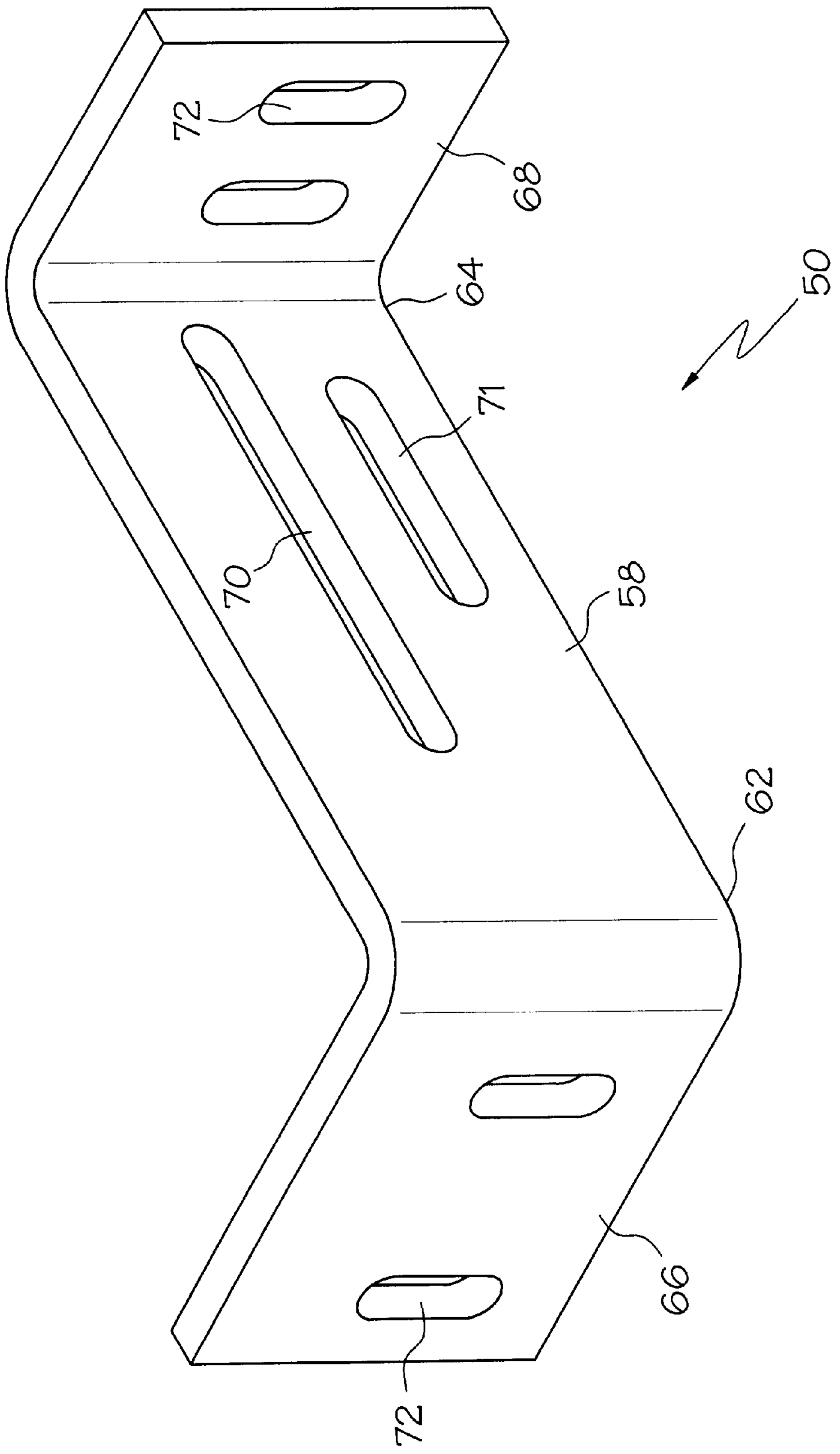
FIG. 4 shows a perspective view of a sump stabilizer bar according to one embodiment of this invention.
Figure 5:
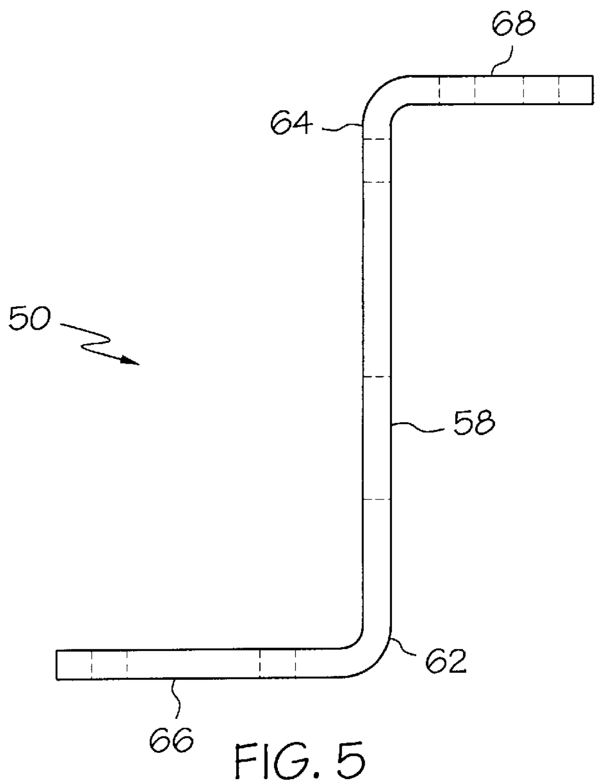
FIG. 5 shows a top view of the sump stabilizer bar shown in FIG. 4.
Figure 6:
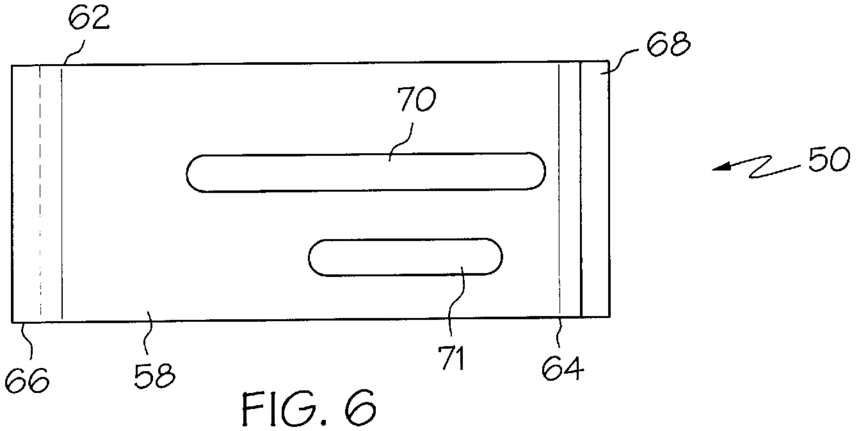
FIG. 6 shows a front view of the sump stabilizer bar shown in FIG. 4.
Figure 7:
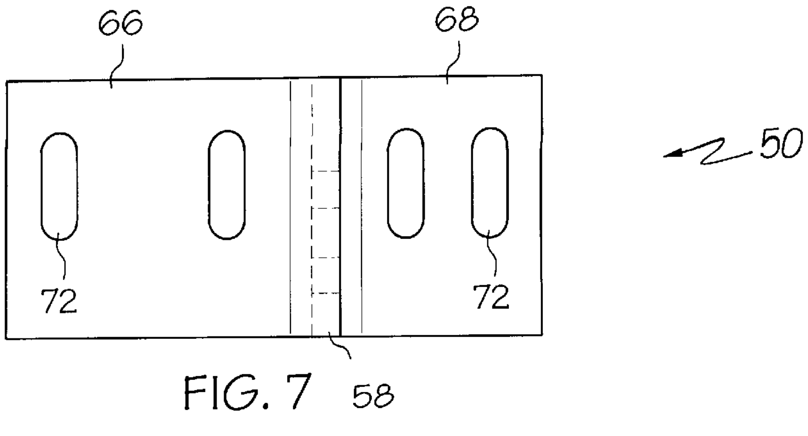
FIG. 7 shows a side view of the sump stabilizer bar shown in FIG. 4.

As shown in FIGS. 2 and 3, sump wall 21 defines a chamber which is substantially below the top surface 15 of the island 14. As shown here, the chamber is pear-shaped, but other shaped sumps may also be used. For instance, shallow rectangular sumps, sometimes referred to as pans, could also be used with the present invention. The lower half of the sump 20 is surrounded by backfill 17. The sump 20 rises up through the pavement 16 and through the island 14, from which the sump mouth 22 opens to the inside of the fuel dispenser 13.

The sump wall 21 prevents the backfill 17, pavement 16, and island 14 from compromising the general shape of the sump. As sump 20 is also designed to contain fuel leaks and spills and prevent groundwater from entering the chamber, sump walls 21 are preferably waterproof and resistant to gasoline, and can be made from materials such as plastic, metal, fiberglass, and the like.

Mounting struts 23 and frame 30 are attached to the sump wall 21 using a series of assembly bolts 24. Preferably, the frame 30 surrounds the sump mouth 22 and helps provide structural integrity to the sump wall 21 so that the backfill 17 and pavement 16 will not collapse the sump during the installation. Among other functions, the frame 30 also provides an anchor for the struts 23.

The struts 23 provide a structure upon which stabilizer bars 50 may be securely fastened. As shown in FIGS. 2 and 3, the struts 23 are preferably elongate channel members and are installed in parallel pairs. Struts 23 according to this embodiment allow the stabilizer bar 50 to be adjustably mounted along the length of the struts. Shear valves 60 are mounted to these stabilizer bars 50 to provide the requisite structural support for the valves to shear in the event the fuel dispenser 13 is damaged or destroyed. Other components, such as vapor break-away valves (not shown) and riser pipes 36, may also be mounted to the stabilizer bars 50.

Lugs 34 are embedded in the island 14 to anchor the frame 30 thereto. Additional anchorage can be provided by the assembly bolts 24 which can extend deeply into the island 14. Preferably, the frame 30 circumscribes the sump mouth 22 and includes lugs 34 on the sides to provide maximum anchorage. A flange 40 lies approximately level with the top surface 15 of the island 14. The fuel dispenser 13 mounts on top of the island 14 using fasteners 32, which extend through apertures in flange 40 and are embedded in the island 14.

Prior to installing the sump 20 into the ground, the frame 30, strut 23 and sump wall 21 are connected using a series of assembly bolts 24 which extend outwardly through the strut, the wall, and the frame. The stabilizer bar 50 can then be secured to the struts 23 using stabilizer bolts 52 and nuts 48 (preferably spring nuts to help lock the stabilizer bar in place). Toothed periphery type lockwashers can also be used in conjunction with the stabilizer bolts 52 to further restrict stabilizer bar 50 from rotating and sliding.

After mounting the stabilizer bar 50, the shear valve 60 can be secured to the stabilizer bar using mounting bolts 56. Toothed periphery type lockwashers 54 can also be used in conjunction with the mounting bolts 56 to further restrict shear valve 60 from rotating and sliding. With shear valve 60, stabilizer bar 50, strut 23, and sump wall 21 together as a sump assembly 26, a hole is dug in the ground into which the sump assembly is placed.

The hole should be deep enough so that the flange 40 will be aligned with the desired level for the top surface 15 of the island 14. Fittings and pipes 12 and 36 are installed in the sump 20. Then, backfill 17 is placed in the hole to a predetermined level. Pavement 16 is then poured over the backfill 17 and around the sump 20. Next, the island 14 is poured such that the top surface 15 is level with the flange 40. Preferably, the pavement 16 and island 14 are formed from concrete, however, other materials, such as asphalt and the like, can be used.

The sump assembly 26 also includes a series of fasteners 32, shown here as L-bolts, extending up through the flange 40. These fasteners 32 are used for mounting structures, such as the fuel dispenser 13. Close alignment with the mating portions of the fuel dispenser 13 is achieved by corresponding holes 90 in the flange 40. During the pouring of the pavement 16 and the island 14, the fasteners 32 become anchored in the ground.

FIGS. 4–7 illustrate several views of a stabilizer bar 50 according to one embodiment of the present invention. The stabilizer bar 50 includes a mount, such as a substantially planar and continuous mounting plate 58, having a first end 62 and a second end 64. Preferably, the stabilizer bar 50 is installed in the sump 20 so that the plate 58 is substantially laterally disposed within the sump and between the struts 23. While shown here as rectangular-shaped, plate 58 can have a variety of shapes and features. For example, plate 58 can be of any polygonal shape, or the like, and have a variety of heights, widths, and thicknesses.

As depicted here, the plate 58 is configured to mount components, such as a shear valve 60, to the stabilizer bar 50. Other components, such as vapor valves (not shown) and riser pipes 36, may also be mounted to the stabilizer bars 50. Preferably, and as shown in the figures, a series of elongated slots 70 and 71 configured to cooperate with at least one fastener, such as the mounting bolts 56 depicted in FIGS. 2 and 3, are disposed on the plate 58. The slots 70 and 71 can have a variety of lengths and widths. In yet other embodiments, holes, variable weld surfaces, rails, screws, rivets, u-bolts, hooks, adhesion surfaces, or other openings or structures can be employed to mount components to the plate 58.

As shown in the figures, according to a preferred embodiment of the present invention, the slots 70 and 71 are preferably disposed lengthwise on plate 58 and parallel to one another. By providing the plate 58 with the elongated slots 70 and 71 in this manner, a component can be adjustably mounted to the plate along the distance of the slots. In a further preferred embodiment, the lengths of each of the slots 70 and 71 are independently minimized to maintain the structural integrity of the plate 58, while still allowing for compatibility with a variety of components.

According to one embodiment of the present invention, first and second connectors, respectively comprising first tab 66 and second tab 68, cooperate with the plate 58 adjacent to the first end 62 and second end 64 of the plate, respectively. Either or both of the tabs 66 and 68 can be provided as part of the plate 58, such as being formed from a continuous material, or can be attached thereto, so long as the component can be mounted in proximity to at least one of the structures, such as struts 23, without interference from the bar 50. For example, according to one embodiment of the present invention, a sump stabilizer bar 50 can be provided that allows a component, such as shear valve 60, to be mounted in close proximity to, or substantially flush with, a wall 21 of sump 20, without substantial interference from the bar. Preferably, the component can be mounted to the bar so that the component is separated from the wall by effectively only the previously mentioned required assured cleared distance. As shown in FIG. 3, a bar 50 according to one embodiment of the present invention can include an integrally connected tab 68 that does not interfere with the ability to mount a component to the plate 58 along the length of the plate.

Tabs 66 and 68 preferably extend away from plate 58 in generally opposite directions. More preferably, the tabs 66 and 68 are generally perpendicularly arranged with respect to first and second sides 86 and 88 of the plate 58, respectively. While shown here as rectangular-shaped, tabs 66 and 68 can have a variety of shapes and features, such as trapezoidal, triangular, or the like.

The tabs 66 and 68 are configured to attach the stabilizer bar 50 to, for example, the struts 23. As shown in FIGS. 4–8, a pair of elongated slots 72 configured to cooperate with at least one fastener, such as the stabilizer bolts 52 depicted in FIGS. 2 and 3, can be disposed on each of the tabs 66 and 68. The slots 72 can have a variety of lengths and widths.

As shown in the FIGS. 4–8, the slots 72 can be vertically disposed and parallel to one another on tabs 66 and 68. By providing the tabs 66 and 68 with the elongated slots 72 in this manner, the stabilizer bar 50 and attached components can be vertically adjusted during mounting to the struts 23. Alternatively, slots 72 could be, for example, angled to allow for both horizontal and vertical adjustment. Optionally, a plurality of shims (not shown) may be inserted between one or both of the tabs 66 and 68 and the struts 23, if needed to properly fit the stabilizer bar 50 between the struts. In yet other embodiments, holes, variable weld surfaces, rails, screws, rivets, u-bolts, hooks, adhesion surfaces, or other openings or structures can be provided on the tabs to facilitate mounting the stabilizer bar 50 to the struts 23.

In a preferred embodiment, first tab 66 is longer than second tab 68. In this embodiment, the shear valve 60 is mounted to the side 86 of the plate 58 away from which first tab 66 extends. Such an embodiment may maximize the separation of potential connection axes or pivot points between stabilizer bar 50 and struts 23, while preserving the compactness of the bar, by extending first tab 66 for a distance substantially equidistant to the width of a mounted shear valve 60.

Figure 9:
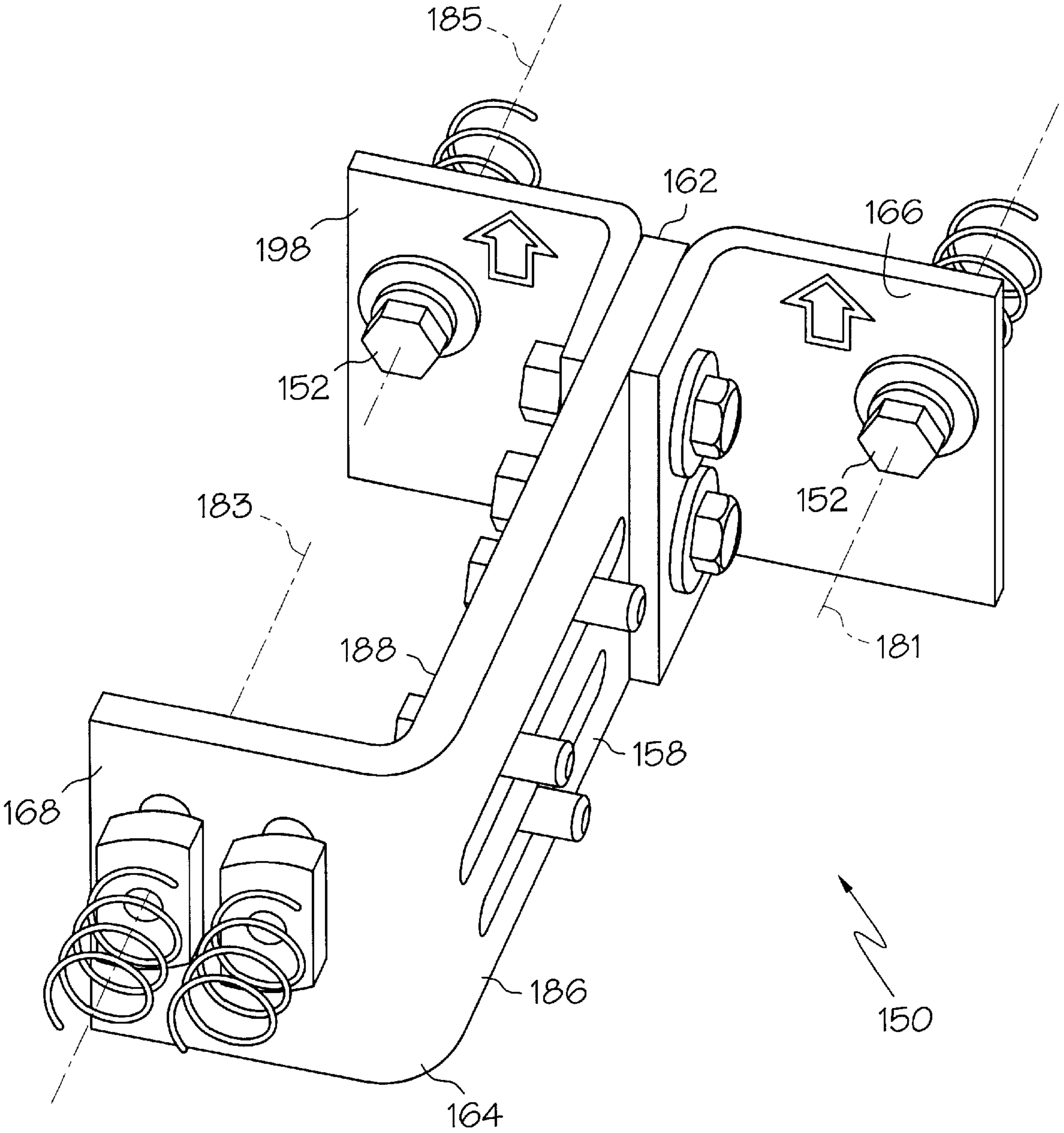
FIG. 9. shows a perspective view of a sump stabilizer bar and associated hardware according to another embodiment of this invention.

As shown in FIG. 9, in accordance with this invention, a third connector, such as one comprising a third tab 198 connected to the plate 158, can cooperate with the plate adjacent to one of the ends (e.g., 162). Preferably, the third tab 198 is arranged so that the third tab lies substantially coplanar with one of the tabs (e.g., 166), and extends away from the second side 188 of the plate 158 in a direction generally opposite from the coplanar tab. For example, such a third tab 198 could be connected to one of the ends, such as end 162, to give that end a T-shaped appearance. This embodiment of the stabilizer bar 150, however, may not be preferred in some instances as the third tab 198 is arguably unnecessary, and the bar could be more expensive to manufacture and assemble.

According to this embodiment of the invention, and as understood by one of ordinary skill in the art, each of the tabs 166, 168, and 198, in cooperation with a respective fastener 152, respectively define connection axes (e.g., 181, 183, and 185), each having respective tolerances of location and orientation. According to this invention, connection axes 181 and 183 are generally non-collinear, taking into account their respective tolerances. It has been found that providing generally non-collinear axes can help the bar 150 resist resultant rotational forces, as each connector restricts the ability of the bar to rotate about the connection axis associated with the other connector.

By introducing a third connector, and an associated third connection axis (e.g., 185) that is substantially non-collinear with the first connection axis 181, the effect of any tolerances associated with the other connectors can be further reduced, and the ability of the bar 150 to resist rotational forces further enhanced. To even further resist such rotational forces, the tabs, such as tab 168, can also be configured to cooperate with additional fasteners. For example, as shown in FIGS. 9 and 10, tab 168 can be provided with a pair of elongated slots, each of which is configured to securely receive a fastener, such as bolt 152, along the length of the respective slot.

Figure 10:
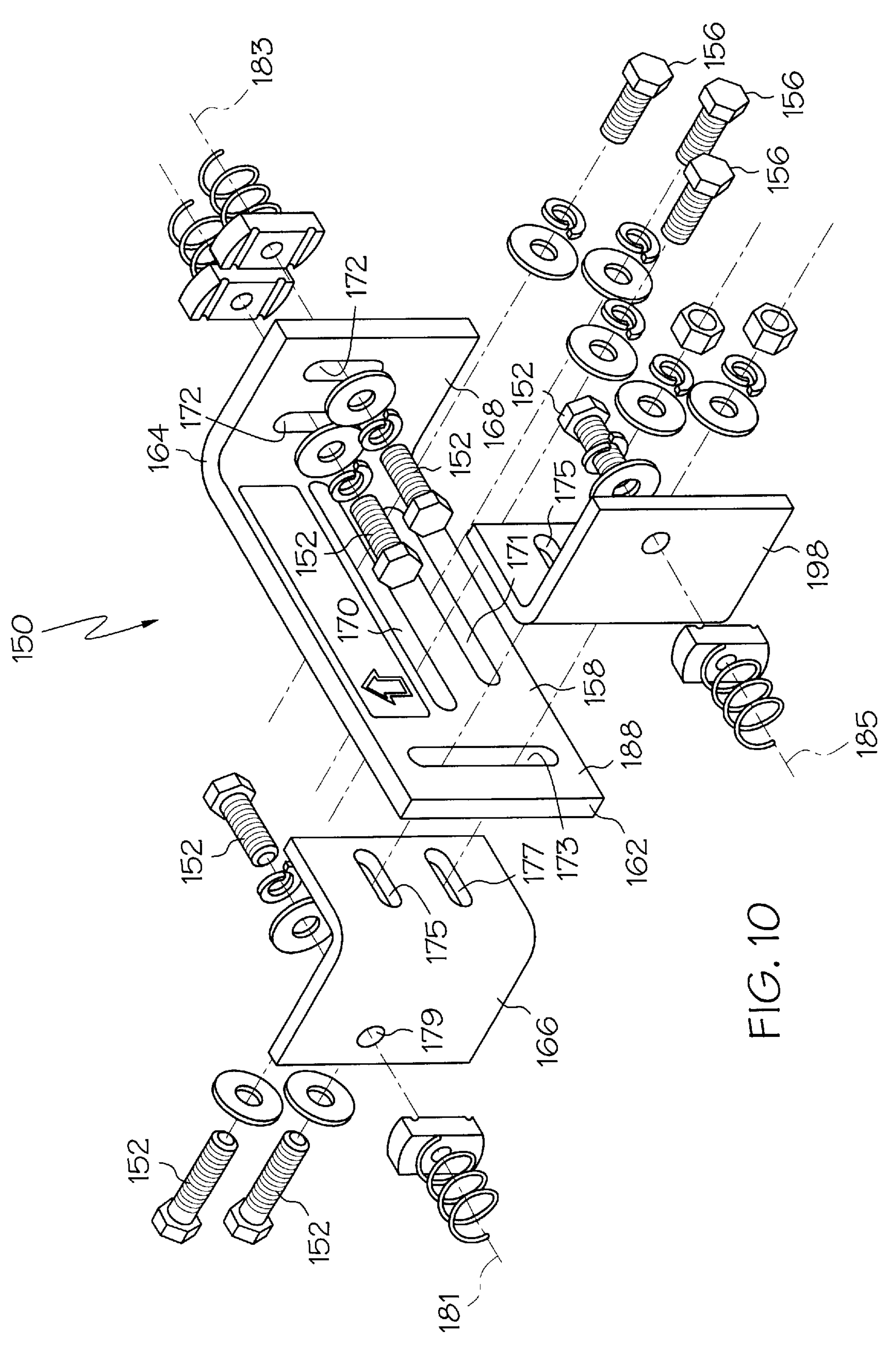
FIG. 10 shows an exploded perspective view of the sump stabilizer bar and hardware shown in FIG. 9.

As shown in the embodiment depicted in FIG. 10, adjustability of the bar 150 can also be included by providing the plate 158 with an elongated slot 173, or similar slot, hole, variable weld surface, rail, screw, rivet, u-bolt, hook, adhesion surface, or other opening or structure configured to adjustably connect another component. For example, a vertical elongated slot, such as slot 173, can provide bar 150 with vertical adjustability. According to this embodiment, a tab 166 (and/or tab 198) can be adjustably attached to the plate 158 using slot 173. One advantage of such an embodiment could be that a lower tolerance configuration to cooperate with the fastener 152, such as a hole 179, can be used to mount the bar 150 to the respective structure.

In addition, the tab 166 (and/or tab 198) can also be provided with an elongated slot, such as slot 175, or similar slot, hole, variable weld surface, rail, screw, rivet, u-bolt, hook, adhesion surface, or other opening or structure configured to adjustably connect another component, to cooperate with the plate 158 in providing additional adjustability. For example, a horizontal elongated slot, such as slots 175 and 177, can provide bar 150 with adjustability between, for example, struts (not shown). One advantage of providing bar 150 with elongated slots 175 and 177 can be that the need for also using shims is avoided or reduced.

As depicted in FIGS. 4–8, the plate 58 and tabs 66 and 68 making up stabilizer bar 50 can be made from a continuous material. For the purposes of this specification and claims, "continuous material" means that two or more components share a homogeneous continuum of the same material. Therefore, continuous material includes a formed sheet of material, parts molded from powdered metals or resins, castings, plastics, composites, forging and the like. Meanwhile, as used herein, the term "integrally connected" refers to a method of connecting components wherein the connection comprises relatively unobtrusive connection structure. Integrally connected components can include, for example, components that are effectively bonded together, notwithstanding any frictional connection, such as where they have been formed from a continuous material or bonded together through operations such as, for example, welding or other fusion operations.

Figure 8:
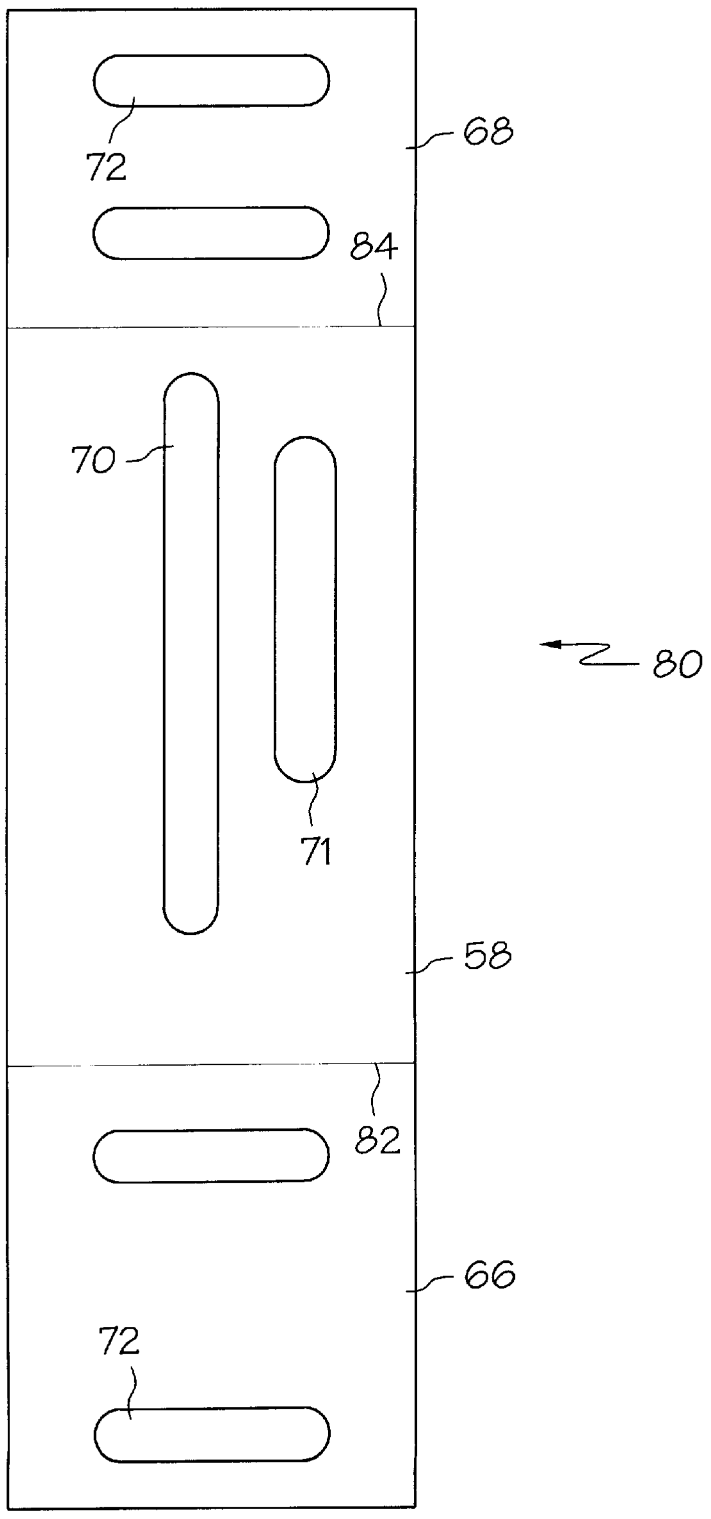
FIG. 8 shows a top view of a continuous material used to make the sump stabilizer bar shown in FIG. 4.

As shown in FIG. 8, according to one embodiment of the present invention, the plate 58 and tabs 66 and 68 can be formed from a single sheet of material 80, such as carbon steel. Slots 70, 71, and 72 are cut in the material 80 to provide the mounting mechanisms. The sheet of material 80 is then bent at predetermined locations to form tabs 66 and 68. The bend locations can be straight or curved, and the bends themselves can be sharp or rounded at any one of a variety of angles or curves, however, it is preferred that each bend be about 90 degrees. In the embodiment of FIG. 8, the first bend location 82 defines first tab 66 and the second bend location 84 defines second tab 68.

The resulting stabilizer bar 50 can be manufactured quickly and inexpensively, and requires little or no assembly. Additionally, the stabilizer bar 50 can avoid weld joints, thus providing improved corrosion resistance. The foregoing detailed description of the invention has been presented for purposes of illustration and description. It is not intended to be exhaustive nor limit the invention to the precise form disclosed. Many alternatives, modifications and variations will be apparent to those skilled in the art in light of the above teaching.

For instance, the present invention is not limited to sumps, and can be used in conjunction with virtually any opening in which an adjustable stabilizer bar is desirable. Additionally, the stabilizer bar need not be used to anchor shear valves or in conjunction with filling stations. Furthermore, although some of the embodiments of the present invention can be formed from continuous or one piece materials, the present invention can be formed from physically separate components, wherein the separate components can each comprise the same materials, or can be individually formed from separate materials. Accordingly, this invention is intended to embrace all such alternatives, modifications and variations that fall within the spirit and broad scope of the appended claims and their equivalents.

I claim:

1. A stabilizer bar for securely mounting a component to a sump, comprising:

a) a mounting plate having first and second ends, and configured such that the component may be attached to the plate; and b) first and second tabs connected to the first and second ends, respectively, of the plate, said tabs extending away from the ends of the plate and in generally opposite directions from one another, each of said tabs being configured such that the stabilizer bar may be attached to the sump.

2. A stabilizer bar as recited in claim 1, wherein said mounting plate is rectangular.

3. A stabilizer bar as recited in claim 1, wherein one of said tabs is longer than the other.

4. A stabilizer bar as recited in claim 1, wherein each of said tabs extends substantially perpendicularly away from said plate.

5. A stabilizer bar as recited in claim 1, wherein said plate and said tabs are each disposed with at least one elongated slot for receiving a fastener.

6. A stabilizer bar as recited in claim 5, wherein each of said at least one slot on the plate is substantially perpendicularly oriented to each of said at least one slot on each of said tabs.

7. A stabilizer bar as recited in claim 1, wherein the mounting plate and tabs are made from a continuous material.

8. A stabilizer bar as recited in claim 1, wherein the mounting plate and tabs are made from a single sheet of material.

9. A stabilizer bar as recited in claim 1, further comprising a third tab, said third tab attached to the first end of the plate and extending away from the plate in the same direction as said second tab.

10. A sump assembly, comprising:

a) a sump, said sump having an interior wall and b) a stabilizer bar for securely mounting a component to the sump, said stabilizer bar comprising (i) a mounting plate having first and second ends, and configured such that the component may be attached to the plate; and (ii) first and second tabs connected to the first and second ends, respectively, of the plate, said tabs extending away from the ends of the plate and in generally opposite directions from one another, each of said tabs being configured such that the stabilizer bar may be attached to the interior wall of the sump.

11. A sump assembly as recited in claim 10, further comprising a component attached to said plate, wherein said component comprises a shear valve.

12. A sump assembly as recited in claim 10, wherein the mounting plate is rectangular.

13. A sump assembly as recited in claim 10, wherein one of said tabs is longer than the other.

14. A sump assembly as recited in claim 10, wherein each of said tabs extends substantially perpendicularly away from said plate.

15. A sump assembly as recited in claim 10, wherein the mounting plate and tabs are made from a continuous material.

16. A sump assembly as recited in claim 10, wherein the mounting plate and tabs are made from a single sheet of material.

17. A sump assembly as recited in claim 10, further comprising a plurality of bolts each having a head and a shank, wherein said plate and said tabs are each disposed with at least one elongated slot for receiving at least one of said bolts, said respective shank of the at least one bolt penetrating one of the at least one slot, and said respective head of the at least one bolt being incapable of penetrating the respective slot.

18. A sump assembly as recited in claim 17, wherein each of said at least one slot on the plate is substantially perpendicularly oriented to each of said at least one slot on each of said tabs.

19. A sump assembly as recited in claim 17, further comprising a toothed lockwasher cooperating with each said bolt and respective slot, whereby the lockwasher is secured between the head of the respective bolt and the respective slot.

20. A sump assembly as recited in claim 10, wherein said stabilizer bar further comprises a third tab, said third tab attached to the first end of the plate and extending away from the plate in the same direction as said second tab.

21. An apparatus for mounting a component relative to first and second structures, comprising:

a) a mount having first and second ends;

b) a first connector cooperating with the mount adjacent to the first end of the mount and associated with a first connection axis;

c) a second connector cooperating with the mount adjacent to the second end of the mount and associated with a second connection axis, the first and second connection axes being generally non-collinear, and wherein a component to be mounted can be connected to the mount in proximity to one of the first and second structures in a non-interfering manner.

22. The apparatus according to claim 21, further comprising a third connector cooperating with the mount adjacent to the first end of the mount and associated with a third connection axis, the first and third connection axes being substantially non-collinear.

23. The apparatus according to claim 21, wherein each of the connectors comprises a tab configured to cooperate with at least one fastener, each tab being connected to the mount adjacent to the respective end of the mount.

24. The apparatus according to claim 23, wherein the tab of the first connector extends in a first tab direction relative to the mount and the tab of the second connector extends in a second tab direction relative to the mount, the second tab direction being generally opposite to the first tab direction.

25. The apparatus according to claim 24, further comprising a third tab configured to cooperate with at least one fastener, the third tab being connected to the mount adjacent to the first end of the mount and extending in a third tab direction relative to the mount.

26. The apparatus according to claim 25, wherein the third tab direction is generally opposite to the first tab direction, and the second tab and the third tab are generally parallel to one another.

27. The apparatus according to claim 23, wherein the second tab is integrally connected to the mount.

28. The apparatus according to claim 21, wherein the first and second connectors are configured to attach the apparatus relative to the respective first and second walls of a containment sump.

* * * * *